Dec. 10, 1957 E. I. VALYI 2,815,550
METHOD AND APPARATUS FOR MAKING FOUNDRY MOLDS
Filed Aug. 3, 1954 2 Sheets-Sheet 1

INVENTOR.
EMERY I. VALYI
BY
ATTORNEY

United States Patent Office 2,815,550
Patented Dec. 10, 1957

2,815,550

METHOD AND APPARATUS FOR MAKING FOUNDRY MOLDS

Emery I. Valyi, New York, N. Y., assignor to Bachner-Valyi Development Corporation, Arlington Heights, Ill., a corporation of Delaware Application August 3, 1954, Serial No. 447,630

3 Claims. (Cl. 22—10)

This invention relates to the production of foundry molds or cores, herein referred to generally as molds, in shell form, and more particularly to a method and apparatus for building up a mold shell from a comminuted material and a bonding agent.

An object is to provide a novel and improved method and apparatus for the above purpose.

Various other objects and advantages will be apparent as the nature of the invention is more fully disclosed.

In shell molding of the above type a mixture of comminuted refractory material, and bonding agent either in the form of discrete particles or as a coating on the refractory particles is contacted with a heated pattern until the contacting portion bonds and solidifies into a partially cured shell-like layer having a uniform thickness of, for example, one-eighth inch to one quarter inch, depending upon the time of contact of the mixture with the pattern and the temperature of the pattern. The unbonded portion of the mixture is then removed from contact with the shell and the shell is cured to a hard, strong condition. One form of apparatus for this purpose is described in my copending application Serial No. 293,317 filed June 13, 1952 now Patent 2,724,878 issued Nov. 29, 1955.

In accordance with the present invention the molding mixture is applied to the pattern while the pattern is held face down over a container carrying a bed of the mixture by passing air under pressure through the bed under conditions to cause the bed to become fluent and have the characteristics of a liquid. The fluent material is then caused to flow through risers into contact with the pattern until the desired shell has been formed after which the flow is stopped and the unbonded material is returned to the bed in the container. The shell can then be stripped and cured in any standard manner.

This system eliminates the necessity for inverting the pattern or hopper for applying or dumping the mixture and also provides a uniform and readily controllable operation.

The nature of the invention will be better understood by referring to the following description, taken in connection with the accompanying drawings in which certain specific embodiments have been set forth for purposes of illustration.

Figure 1:
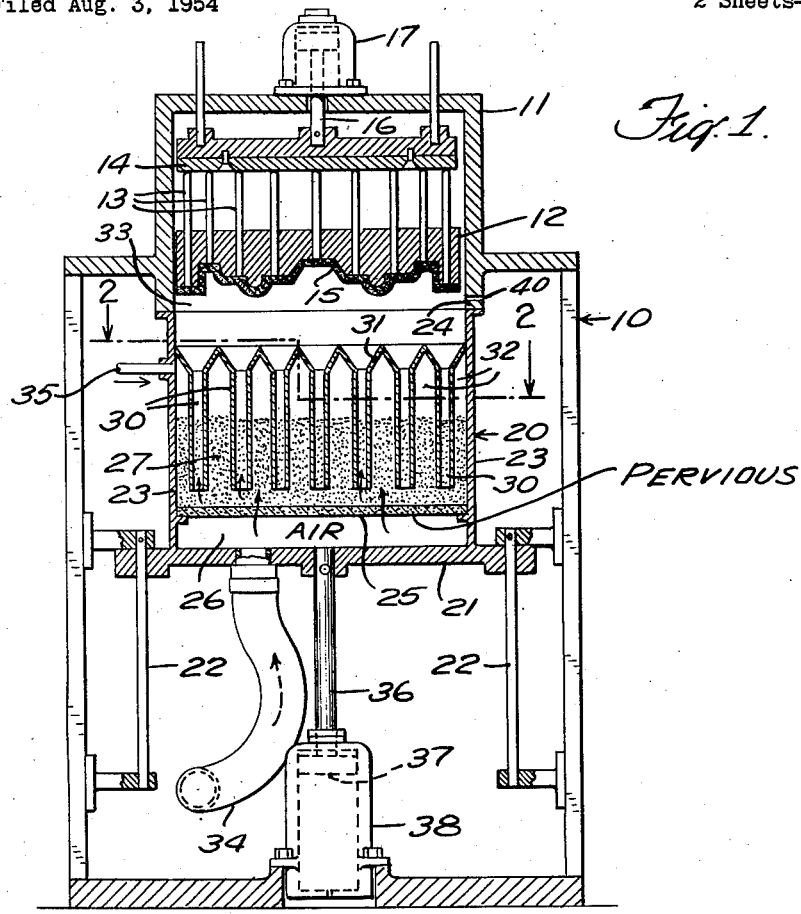
Fig. 1 is a vertical section through a molding apparatus embodying the invention.
Figure 2:
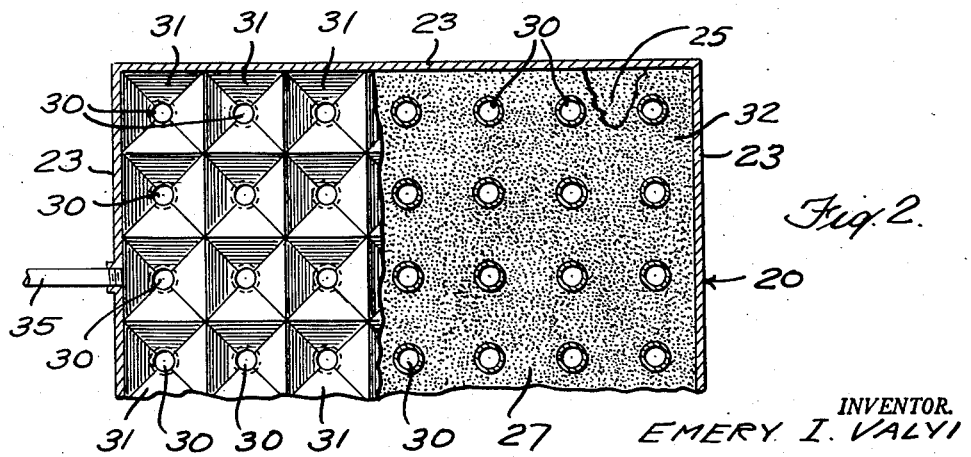
Fig. 2 is a broken horizontal section taken on the line 2—2 of Fig. 1.

Referring to the drawings more in detail the invention is illustrated in Figs. 1 and 2 as embodied in an apparatus comprising a frame 10 to the upper part of which is secured a pattern carrier 11 carrying a pattern 12. Stripper pins 13 attached to a stripper plate 14 extend through the pattern 12 for stripping the mold shell 15 therefrom. The stripper plate 14 is slidable in the frame 10 and is actuated by a rod 16 attached to a piston working in a cylinder 17 attached to the pattern carrier 11 and operated by hydraulic or air pressure to raise or lower the rod 16 as required.

A receptacle 20 having a base 21 is mounted to slide vertically on rods 22 attached to the frame 10. The receptacle 20 has side walls 23 which are adapted to engage a bottom flange 24 on the pattern carrier 11 to form a closed chamber 33 below the pattern 12. A membrane 25 of canvas or other air pervious material, such as ceramic, filter stone, porous brick or metal mesh, is disposed above the base 21 to form an air chamber 26. The membrane 25 supports a bed 27 of the molding mixture.

A bank of riser tubes 30 having flared tops 31 and open at the top and bottom are supported in the container 20 to extend downwardly into the bed 27. The flared tops 31 are joined together and to the walls 23 of the receptacle to form a closed chamber 32 in the receptacle 20 between the membrane 25 and the flared tops 31 of the tubes 30 and a second chamber 33 above the tops 31 and below the pattern 12.

Air for fluidizing the mixture is supplied to the air chamber 26 by a flexible hose 34 and air is supplied to the chamber 32 by a hose 35. The receptacle 20 is raised or lowered by a piston rod 36 attached to a piston 37 operating in a cylinder 38 and actuated by suitable hydraulic or air pressure means.

For fluidizing the bed 27 air under a pressure of from 1 pound to 20 pounds per square inch is supplied to the chamber 26. The pressure depends upon the nature of the material and the thickness of the bed 27. The pressure used is such that the air penetrates the membrane 25 into the material of the bed and causes the material to become fluent as described for example in Patent No. 2,527,488 to Schemm dated October 24, 1950. The term "fluent" is used herein to refer to the condition of such a gas-fluidized bed of solid particles which are capable of flowing like a liquid.

In operation, with the bed 27 fluidized as above described, the receptacle 20 is raised against the flange 24 of the pattern carrier 11 by suitable actuation of the cylinder 38. Conversely, the pattern carrier may be lowered onto the receptacle if desired.

Air under pressure is then supplied to the chamber 32 through the hose 35. The pressure thus exerted on the fluent bed causes the material to rise in the tubes 30 above the level of the bed 27 and to impinge upon or flow against the under surface of the pattern 12. A vent 40 in the bottom flange 24 prevents air pressure from building up in the chamber 33 and interfering with the upward flow of the material in the tubes 30. The solid particles which are not bonded to the pattern to form the shell 15 fall back into the tubes 30 and are returned to the bed 27. The tubes are disposed so that the fluent material projects therefrom in a jet and impinges upon the pattern. The top of the tubes may or may not all be of the same height, depending upon the shape of the pattern. In any case the tops are so located that the jet of material strikes the pattern.

When the shell 15 has been built up to the desired thickness the pressure to the chamber 32 is relieved and the fluent material is restored to the level of the bed 27 in and around the tubes 30. The receptacle can then be lowered, the shell 15 cured, stripped and removed and the operation repeated for the formation of a second shell.

If sufficient pressure differential is built up in the closed space 32 by the air in the fluidized mixture the hose 35 may be omitted or may be closed except for purposes of venting the chamber 32 at the end of the shell forming operation.

The velocity of the stream of fluidized mix emerging from the tubes 30 can be regulated by controlling the air pressure applied to the chamber 32 and is such that the stream impinges uniformly upon all portions of the pattern surface. The material is thus caused to contact all parts of intricate patterns and air locks in raised portions are avoided.

The tubes 30 may also be used to force material into a core box or may be operated so as to maintain a bed of fluidized material in the chamber 33 against the face of the pattern 12.

Figure 3:
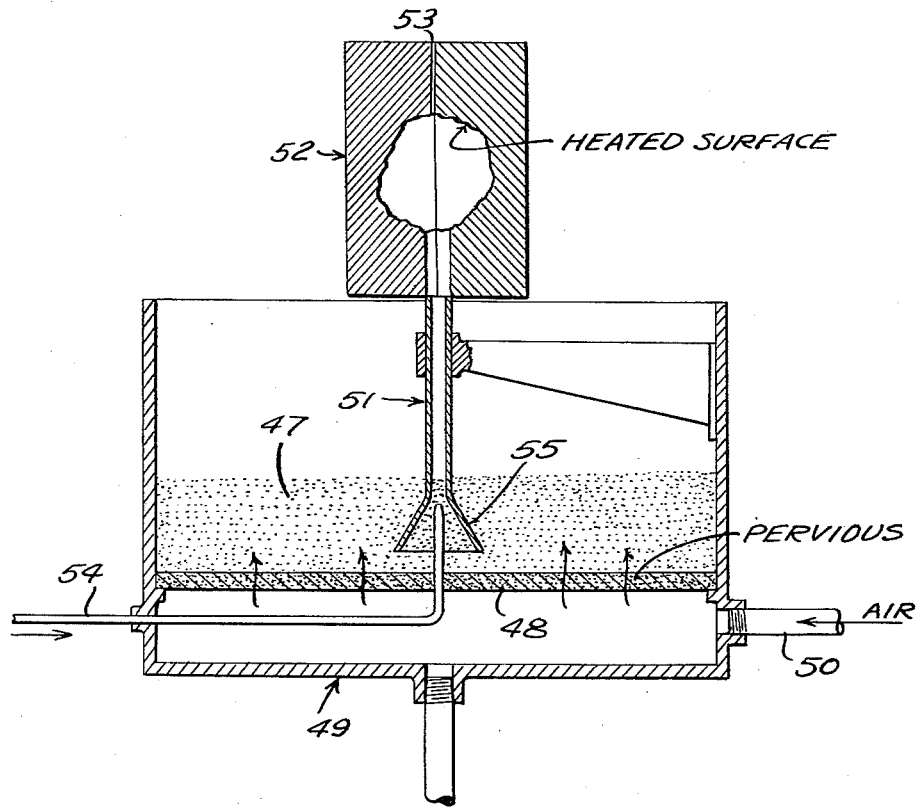
Fig. 3 is a vertical section of an apparatus illustrating a further embodiment of the invention.

The pressure differential can also be effected by suction, as in a Venturi tube. Such an arrangement is shown in Fig. 3 wherein a bed 47 of fluidized material is maintained on a membrane 48 in a receptacle 49 to which fluidizing air is supplied by a pipe 50.

An open tube 51 dips into the bed 47 and is shown as registering with the opening of a split core box 52 having the usual vent 53. An air tube 54 terminates in a flared bottom 55 of the tube 51.

It has been found that this arrangement, operates on the principal of the Bunsen burner and that when air under pressure is ejected from the tube 54 it creates a suction which causes the fluidized molding mixture of the bed 47 to flow upwardly in the tube 51 and to flow out of the top thereof with a controlled velocity.

The molding mixture can be injected into the opening of the core box 52 which can thus be maintained full of the fluidized molding mixture until the desired shell has been formed. The air from the core box cavities escapes through the vent 53 and the particles fall back into the tube 51 upon appropriate regulation of the aspirating pressure and are returned to the bed 47.

This apparatus may of course be used with a pattern as shown in Fig. 1 or the apparatus of Fig. 1 may be used for supplying the molding mixture to a core box as illustrated in Fig. 3.

Various other changes and adaptations will be apparent to a person skilled in the art.

What is claimed is:

1. The method of making a mold shell on a heated surface which comprises passing a fluid through a bed of molding mixture comprising a comminuted refractory and bonding agent under conditions to make the bed fluent, confining said fluent molding mixture in a closed chamber having vertical passages leading to said heated surface, and applying additional fluid pressure to said chamber to force said fluent material through said passages at such velocity as to impinge said fluent material onto said heated surface.

2. Apparatus for making a mold shell on a heated pattern comprising a receptacle adapted to contain a bed of a comminuted refractory molding mixture and having means for passing a gas through said bed under conditions to maintain said bed fluent, said receptacle having means to support a heated pattern face down above said bed and having means forming a closed chamber above said bed, a tube extending from said chamber into proximity to said pattern, and means for supplying air pressure to said chamber above said bed to force the fluent material through said tube and against said pattern.

3. Apparatus for making a mold shell on a heated pattern comprising a receptacle adapted to contain a bed of comminuted refractory molding mixture and having means for passing a gas through said bed under conditions to maintain said bed fluent, said receptacle having a closed chamber above said bed, a pattern holder carrying a heated pattern face down above said bed, a tube extending from said chamber into proximity to said pattern, means for supplying air pressure to said chamber above said bed to force the fluent material through said tube and against said pattern, and means for bringing said receptacle and said pattern holder into contact to form a closure around said pattern.

References Cited in the file of this patent

UNITED STATES PATENTS

| | | |
|---|---|---|
| 1,434,508 | Shimon | Nov. 7, 1922 |
| 1,480,748 | Demmler | Jan. 15, 1924 |
| 1,492,355 | Campbell | Apr. 29, 1924 |
| 2,527,488 | Schem | Oct. 24, 1950 |
| 2,723,838 | Peters | Nov. 15, 1955 |

OTHER REFERENCES

The Foundry, October 1950, pages 162, 164 and 168.